United States Patent
Siraky et al.

(10) Patent No.: US 7,540,095 B2
(45) Date of Patent: Jun. 2, 2009

(54) ROTARY POSITION TRANSDUCER

(75) Inventors: Josef Siraky, Donaueschingen (DE); Rolf Hartlieb, Villingen-Schwenningen (DE)

(73) Assignee: Sick Stegmann GmbH, Donaveschingen (DE)

( * ) Notice: Subject to any disclaimer, the term of this patent is extended or adjusted under 35 U.S.C. 154(b) by 39 days.

(21) Appl. No.: 12/003,007

(22) Filed: Dec. 19, 2007

(65) Prior Publication Data

US 2008/0163502 A1 Jul. 10, 2008

(30) Foreign Application Priority Data

Jan. 5, 2007 (EP) .................. 07000174

(51) Int. Cl.
*G01B 21/20* (2006.01)
*G01B 3/14* (2006.01)
(52) U.S. Cl. .................. 33/1 PT; 33/501.13
(58) Field of Classification Search .......... 33/1 PT
See application file for complete search history.

(56) References Cited

U.S. PATENT DOCUMENTS 5,016,471 A * 5/1991 Och ............ 73/162
7,040,025 B2 * 5/2006 Inoue ........... 33/1 PT
7,447,580 B2 * 11/2008 Lee ............. 701/41
7,458,164 B2 * 12/2008 Perret et al. ....... 33/1 PT

FOREIGN PATENT DOCUMENTS

| DE | 100 60 574 A1 | 6/2002 |
| DE | 101 58 223 A1 | 6/2003 |
| GB | 2 224 554 A | 5/1990 |

* cited by examiner

*Primary Examiner*—Christopher W Fulton
(74) *Attorney, Agent, or Firm*—Tha Nath Law Group; Jerald L. Meyer; Derek Richmond

(57) ABSTRACT

A rotary position transducer has a housing, a rotor, which is connected to a drive shaft to be measured and projects into the housing so as to rotate with it and the angular position of which within one revolution is measured, and a multi-turn unit that is mounted in the housing and measures the number of revolutions of the rotor. The multi-turn unit is coupled with the rotor by way of a gear wheel gear mechanism, which has a driving spur wheel (10) connected to the rotor, and a driven spur wheel (12) of the multi-turn unit. In the case of one of the spur wheels (10), the head of every second tooth (16) is shortened up to the reference circle. In the case of the other spur wheel (12), the base of every second gap (18) between teeth is filled up to the reference circle. The spur wheels (10, 12) are helical-geared, wherein the modulus and the helix angle ($\alpha$) of the helical gearing are determined in such a manner that at least one tooth (16) is always in engagement.

7 Claims, 2 Drawing Sheets

ROTARY POSITION TRANSDUCER

Figure 1:
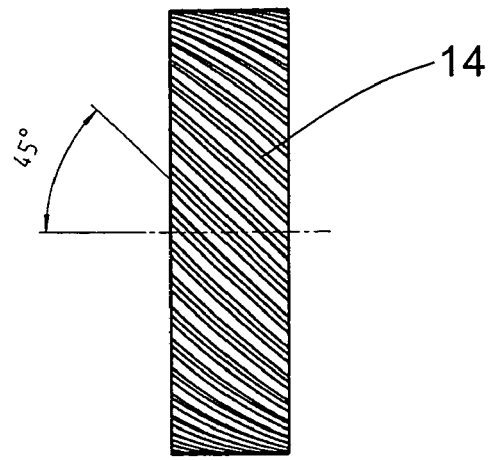

The invention relates to a rotary position transducer in accordance with the preamble of claim 1.

Rotary position transducers serve to measure the angular position of a rotating part, and, if applicable, to measure variables that are dependent on the angular position, such as, for example, speed of rotation, rotational acceleration, and the like. A rotor whose angular position within one revolution is scanned and detected optically, magnetically, capacitatively, or inductively is connected to a drive shaft whose angular position is to be measured. In order to be able to measure the angular position over several revolutions, a multi-turn unit, which measures the number of revolutions of the rotor, is provided. The multi-turn unit is coupled to the rotor by way of a reduction gear mechanism.

In the case of a rotary position transducer such as the one known from DE 100 60 574 A1, for example, both the drive shaft that carries the rotor and the multi-turn unit are mounted in the housing of the rotary position transducer, so that a driving spur wheel that is connected to the rotor and a driven spur wheel of the multi-turn unit are constantly in precise tooth engagement, for the gear connection between the rotor and the multi-turn unit.

Also known are rotary position transducers (e.g. DE 101 58 223 A1) in which, for reasons of cost, the drive shaft that carries the rotor is not mounted separately in the housing of the rotary position transducer. The rotary position transducer is mounted directly, with the rotor, on the drive shaft to be measured. Since the rotor sits on the drive shaft, which projects into the housing but is not mounted in the housing, while the multi-turn unit is mounted in the housing, the problem occurs that the tooth engagement between the driving spur wheel connected to the rotor and the driven spur wheel has installation tolerances that can lead to increased wear of the gearing.

The invention is based on the task of improving a rotary position transducer of the type stated initially in such a manner that undefined play in the gear wheel/gear connection between the rotor and the multi-turn unit is minimized.

This task is accomplished according to the invention by means of a rotary position transducer having the features of claim 1.

Advantageous embodiments of the invention are indicated in the dependent claims.

In the rotary position transducer according to the invention, the driving spur wheel connected to the rotor and the spur wheel of the downstream multi-turn unit driven by the driving spur wheel are configured in such a manner that every second tooth of one of these spur wheels is shortened to the radius of the reference circle of the gearing while, in the other of these spur wheels, the base of every second gap between teeth is filled up to the radius of the reference circle. In this connection, the gearing of the spur wheels is configured as a helical gearing, wherein this helical gearing can be a single or also a double helical gearing. In this connection, the helix angle and the modulus of this helical gearing are selected in such a manner that the two spur wheels always have at least one tooth in engagement.

This configuration of the gearing brings about the result that the two spur wheels engage one another with at least one complete tooth and one complete gap between teeth at a time in order to transfer the precise rotational movement. Furthermore, at every point in time the two spur wheels likewise sit on a filled gap between teeth with one shortened tooth. In this connection, the surfaces of these regions that sit on one another lie in the reference circle of the gearing, which corresponds to the pitch circle of the gearings that roll on one another. In these regions of the shortened teeth and the filled gaps between teeth, the two spur wheels therefore roll on one another in a roll-off movement, thereby causing the two spur wheels that engage one another to also come into engagement precisely in the pitch circle of the gearings in the region of their complete teeth and gaps between teeth, respectively.

This reciprocal support of the spur wheels in the reference circle surfaces and pitch circle surfaces, respectively, has the result that the contact point between the tooth flanks of the complete teeth that bring about tooth engagement cannot migrate radially as the result of installation tolerances, a migration that would lead to radial slipping of the tooth flanks at the contact point, promoting wear.

In order to reliably guarantee this reciprocal pitch support of the spur wheels that engage one another, it is advantageous if the two spur wheels are biased against one another with a spring force that is acts in the direction of the connection line of the axes of these spur wheels.

In the following, the invention will be explained in greater detail using an exemplary embodiment shown in the drawing. This shows FIG. 1 a radial top view of one of the spur wheels, FIG. 2 a perspective view of one spur wheel, with a detail enlargement, FIG. 3 a perspective view of the other spur wheel, with a detail enlargement, FIG. 4 a perspective view of the spur wheels engaging one another, with a detail enlargement.

A rotary position transducer has a housing that is generally mounted in a fixed location, for example on a motor. A drive shaft whose angular position is to be measured, for example the shaft of the motor, projects into the housing of the rotary position transducer. A rotor that is coded incrementally or in absolute manner, for example, sits on the drive shaft; its angular position within one revolution of the rotor is detected by means of a sensor disposed in the housing. Furthermore, a multi-turn unit, which measures the number of revolutions of the rotor, is mounted in the housing in order to be able to detect the angular position over several revolutions.

To this extent, the rotary position transducer corresponds to the known prior art. In this regard, the rotary position transducer can be structured in any desired manner known from the prior art. It is therefore not necessary to present and describe the rotary position transducer in regard to these known features.

In order to detect the number of revolutions of the rotor by means of the multi-turn unit, a first helical-geared spur wheel 10 is connected to the rotor so as to rotate with it. As the driving gear wheel, this spur wheel 10 stands in tooth engagement with a driven second helical-geared spur wheel 12, which is the input gear wheel of the gear mechanism of the multi-turn unit. The gearings 14 of the two spur wheels 10 and 12 correspond to one another in terms of helix angle and modulus.

In contrast to a conventional gearing 14, the teeth 16 and gaps 18 between teeth of the gearing 14 in the spur wheels 10 and 12 are modified as follows.

Figure 2:
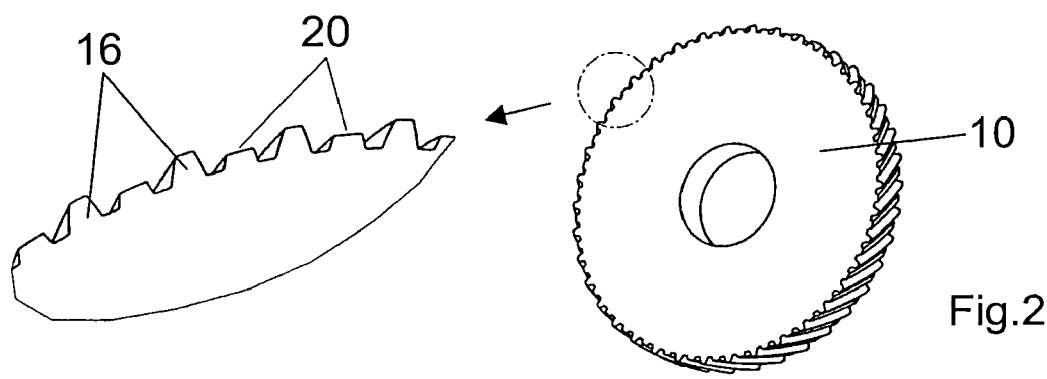
Figure 3:
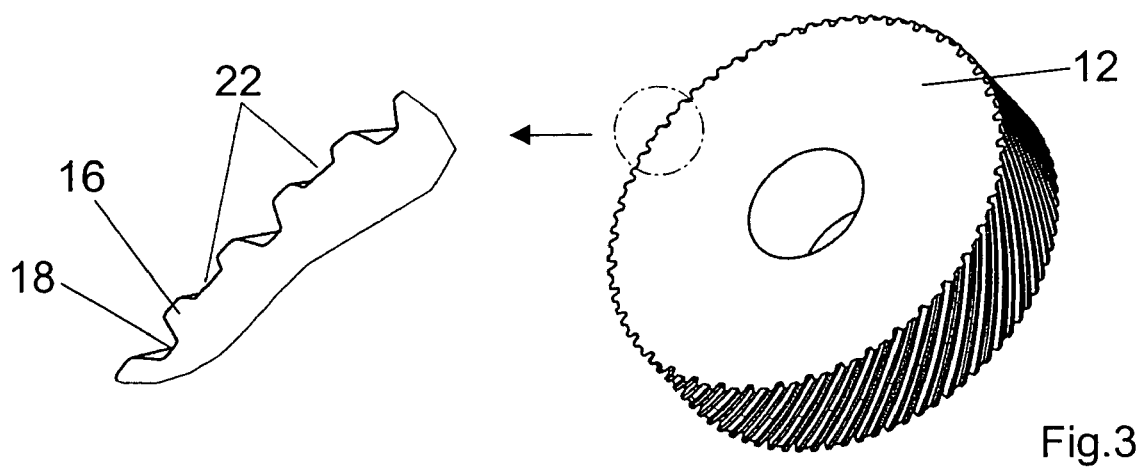

In the case of one of the spur wheels, spur wheel 10 in the example shown, the addendum of every second tooth 16, is shortened to the radius of the reference circle, as can be seen from the teeth 20 in the enlarged detail view of FIG. 2. In the case of the other spur wheel, the second spur wheel 12 in the example shown, in contrast, the base of every second gap 22 between teeth is filled up to the radius of the reference circle, as can be seen in the detail enlargements of FIG. 3.

Figure 4:
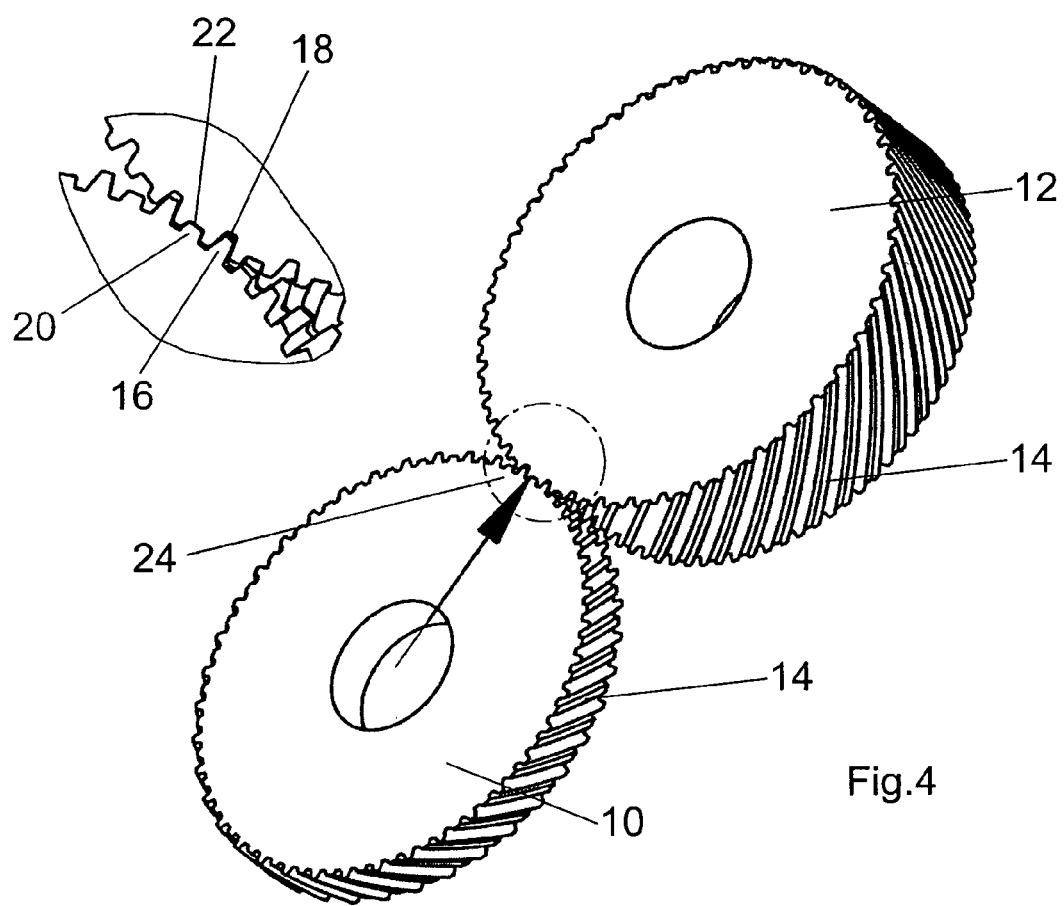

When the spur wheels 10 and 12 are in engagement, as is shown in FIG. 4, complete teeth 16 engage complete gaps 18 between teeth, while a shortened tooth 20 meets a filled gap 22 between teeth, offset by one pitch. The complete teeth 16 and gaps 18 between teeth that engage one another bring about the rotational drive of the driven spur wheel 12 by the driving spur wheel 10. The shortened teeth 20 and the filled gaps 22 between teeth roll off one another with surfaces that support one another in the radial direction, these surfaces lying in the reference circle that coincides with the pitch circle of the gearing 14, as is the case with an involute gearing, for example.

In order for the gearings 14 of the spur wheels 10 and 12 to constantly stand in engagement in spite of the shortened teeth 20 and the filled gaps 22 between teeth, the helix angle $\alpha$ of the gearing 14 and its modulus are selected in such a manner that at least one tooth 16 is always in engagement with a complete gap 18 between teeth, as is evident in the detail enlargement of FIG. 4. In the example of FIG. 1, the helix angle $\alpha$ is indicated as being 45°.

The complete teeth 16 and gaps 18 between teeth bring about the rotational drive. Because of the shortened teeth 20 and the filled gaps 22 between teeth, the spur wheels 10 and 12 are always supported on one another, rolling on their pitch circle, so that optimal tooth engagement is always guaranteed, independently of play tolerances. In order to additionally ensure that the spur wheels 10 and 12 are always in rolling contact with their shortened teeth 20 and filled gaps 22 between teeth, the spur wheels 10 and 12 can additionally be biased by a spring force, which presses the spur wheels 10 and 12 against one another in the direction of the connection line of their axes, as is indicated by the arrow 24 in FIG. 4.

The invention claimed is:

1. Rotary position transducer comprising a housing, a rotor, which is connected to a drive shaft to be measured and projects into the housing so as to rotate with it and the angular position of which within one revolution is measured, and a multi-turn unit, which is mounted in the housing and measures the number of revolutions of the rotor, wherein the multi-turn unit is coupled to the rotor by way of a gear wheel gear mechanism, which has a driving spur wheel (10) connected to the rotor and a driven spur wheel (12) of the multi-turn unit, characterized in that in the case of one of the spur wheels (10), the head of every second tooth (16) is shortened up to the reference circle, that in the case of the other spur wheel (12), the base of every second gap (18) between teeth is filled up to the reference circle, and that the spur wheels (10, 12) are helical-geared, wherein the modulus and the helix angle ($\alpha$) of the helical gearing (14) are determined in such a manner that at least one tooth (16) is always in engagement.

2. Rotary position transducer according to claim 1, characterized in that the spur wheels (10, 12) are biased against one another by means of a spring force that acts in the direction of the connection line of their axes.

3. Rotary position transducer according to claim 2, characterized in that the drive shaft projects into the housing without a separate mounting.

4. Rotary position transducer according to claim 2, characterized in that the helical gearing (14) of the spur wheels (10, 12) is an involute gearing.

5. Rotary position transducer according to claim 1, characterized in that the drive shaft projects into the housing without a separate mounting.

6. Rotary position transducer according to claim 5, characterized in that the helical gearing (14) of the spur wheels (10, 12) is an involute gearing.

7. Rotary position transducer according to claim 1, characterized in that the helical gearing (14) of the spur wheels (10, 12) is an involute gearing.

* * * * *

UNITED STATES PATENT AND TRADEMARK OFFICE
CERTIFICATE OF CORRECTION

PATENT NO.          : 7,540,095 B2
APPLICATION NO.     : 12/003007
DATED               : June 2, 2009
INVENTOR(S)         : Joseph Siraky and Rolf Hartlieb It is certified that error appears in the above-identified patent and that said Letters Patent is hereby corrected as shown below:

Claim 4, Column 4, Lines 24-25:

Please delete "...claim 2, characterized..."

and replace with

-- claim 1, characterized --

Claim 5, Column 4, Lines 27-28:

Please delete "...claim 1, characterized...,"

and replace with

-- claim 2, characterized --

Claim 6, Column 4, Lines 30-31:

Please delete "…claim 5, characterized...,"

and replace with

-- claim 2, characterized --

UNITED STATES PATENT AND TRADEMARK OFFICE
CERTIFICATE OF CORRECTION

PATENT NO. : 7,540,095 B2
APPLICATION NO. : 12/003007
DATED : June 2, 2009
INVENTOR(S) : Joseph Siraky and Rolf Hartlieb It is certified that error appears in the above-identified patent and that said Letters Patent is hereby corrected as shown below:

Claim 7, Column 4, Lines 33-34:

Please delete "...claim 1, characterized...,"

and replace with

-- claim 3, characterized --

Signed and Sealed this

Eleventh Day of August, 2009

David J. Kappos
*Director of the United States Patent and Trademark Office*